(12) United States Patent
Ozen

(10) Patent No.: US 8,149,960 B2
(45) Date of Patent: *Apr. 3, 2012

(54) CHANNEL ESTIMATION FOR FREQUENCY SELECTIVE MULTIPATH CHANNELS WITH LONG DELAY SPREADS BASED ON AN ASSUMED PHYSICAL CHANNEL

(75) Inventor: Serdar Ozen, Vernon Hills, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 2921 days.

This patent is subject to a terminal disclaimer.

(21) Appl. No.: 10/444,337

(22) Filed: May 23, 2003

(65) Prior Publication Data

US 2004/0240587 A1 Dec. 2, 2004

(51) Int. Cl.
*H03D 1/00* (2006.01)
*H04L 27/06* (2006.01)
(52) U.S. Cl. ......... 375/343; 375/316; 714/794; 714/796
(58) Field of Classification Search ............... 375/343, 375/316; 714/794, 796
See application file for complete search history.

(56) References Cited

U.S. PATENT DOCUMENTS

| 5,903,610 | A  | * | 5/1999 | Skold et al. ............... | 375/285 |
| 7,035,353 | B2 | * | 4/2006 | Fimoff et al. ............... | 375/340 |
| 2002/0024994 | A1 | * | 2/2002 | Piirainen et al. ........... | 375/231 |
| 2003/0043887 | A1 |   | 3/2003 | Hudson | |
| 2004/0234009 | A1 | * | 11/2004 | Fimoff et al. ............... | 375/343 |

FOREIGN PATENT DOCUMENTS

WO WO 03/036891 A2 5/2003

OTHER PUBLICATIONS

Giannakis et al., "Signal Processing Advances in Wireless & Mobile Communications: vol. 1: Trends in Channel Estimation and Equalization", Prentice Hall—2001.
De Carvalho et al., "Semi-Blind Maximum-Likelihood Multichannel Estimation with Gaussian Prior for the Symbols using Soft Decisions", IEEE Vehicular Technology Conference Proceedings 1998, pp. 1563-1567.
Özen et al., "A Novel Channel Estimation Method: Blending Correlation and Least-Squares Based Approaches", Proceedings of ICASSP, 2002, 4 pgs.
Özen et al., "Structured Channel Estimation Based Decision Feedback Equalizers for Sparse Multipath Channels with Applications to Digital TV Receivers", to be published in the proceedings of Asilomar Signals and Systems Conference—2002.
Arslan et al., "Channel estimation in narrowband wireless communication systems", Wireless Communications and Mobile Computing, vol. 1, pp. 201-219, 2001.
Song, "A Channel Estimation Using Sliding Window Approach and Tuning Algorithm for MLSE", IEEE Communications Letters, vol. 3, pp. 211-213, 1999.
ATSC Digital Television Standard, (Annex D) Sep. 1995, pp. 46-60.

* cited by examiner

*Primary Examiner* — Ted Wang

(57) ABSTRACT

A channel impulse response is determined for a channel by receiving a signal from the channel, and by determining a least squares estimate of the channel impulse response. The received signal contains a training sequence and unknown data. The least squares estimate of the channel impulse response is determined by multiplying the received signal by a stored quantity. The stored quantity is based on (i) a stored replica of the training sequence, and (ii) an assumed covariance matrix that is based on a noise variance and an initial channel impulse response that assumes a unit physical channel.

18 Claims, 2 Drawing Sheets

| k | -2 | -1 | 0 | 1 | 2 | 3 | 4 | 5 | 6 |
|---|---|---|---|---|---|---|---|---|---|
| $\{\tau_k\}$ | -60.277 | -0.957 | 0 | 3.551 | 15.250 | 24.032 | 29.165 | 221.2345 | 332.9810 |
| $\{|c_k|\}$ | 0.55 | 0.7263 | 1 | 0.6457 | 0.9848 | 0.7456 | 0.8616 | 0.6150 | 0.4900 |
*Figure 1*
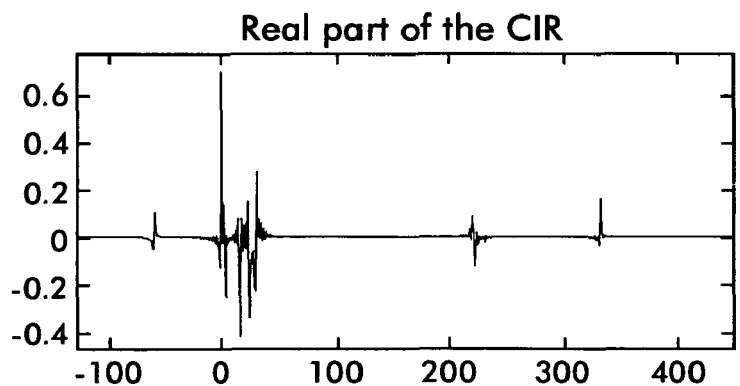
*Figure 2a*
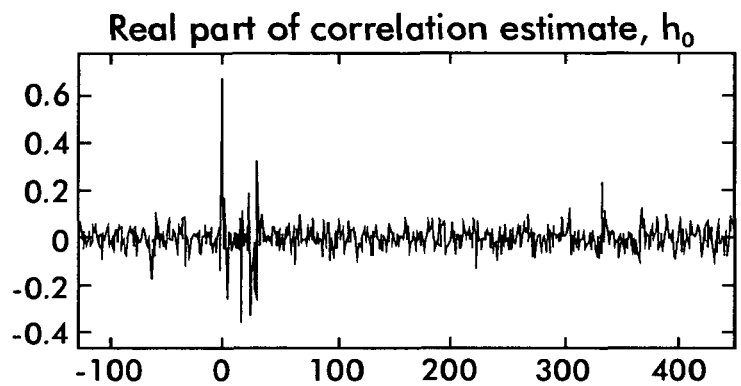
*Figure 2b*
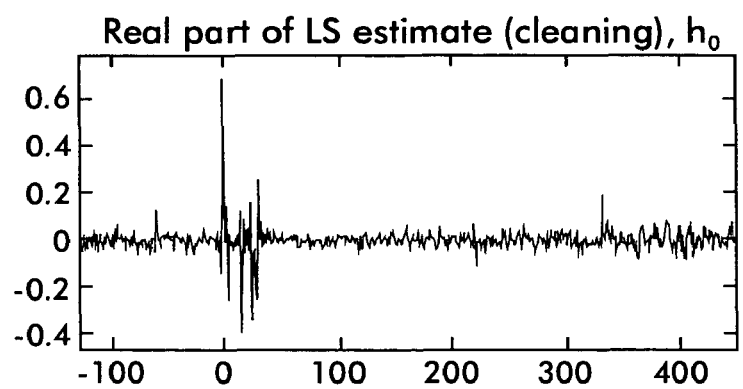
*Figure 2c*

CHANNEL ESTIMATION FOR FREQUENCY SELECTIVE MULTIPATH CHANNELS WITH LONG DELAY SPREADS BASED ON AN ASSUMED PHYSICAL CHANNEL

TECHNICAL FIELD OF THE INVENTION

The present invention relates to a channel estimator and, more particularly, to a channel estimator that estimates the response of a channel through which signals are received.

BACKGROUND OF THE INVENTION

For communication systems utilizing periodically transmitted training sequences, least-squares (LS) based and correlation based channel-estimation algorithms have been the most widely used two alternatives for the estimation of the channel. The estimation of the channel is obtained for various purposes such as initializing the tap weights of the taps of an equalizer in a receiver.

Both algorithms (the least-squares (LS) based channel estimation and the correlation based channel estimation) use a stored copy of the known transmitted training sequence at the receiver. The properties and length of the training sequence generally depend on the particular standard specifications of the communication system. A baseline noise term is introduced into the channel estimation whenever the channel impulse response is estimated by a correlation type estimator or by a least square type estimator. This noise term will be increased if the training sequence is short compared to the length of the channel. This noise term results, at least in part, from the correlation of the stored copy of the training sequence with unknown symbols in addition to the known received training symbols. These unknown symbols includes the data symbols that are adjacent to transmitted training sequence. This baseline noise term reduces the accuracy of the channel estimations.

The present invention is directed to the estimation of a channel impulse response (CIR) based both on the training sequence that is periodically transmitted within a continuous stream of information symbols and on the statistics of the unknown data adjacent to the training sequence. Accordingly, this estimation may be referred to as the best linear unbiased estimate of the channel, meaning that the estimate has reduced or minimum variance, that the estimate is based on a linear model, and that the expected value of the estimate is substantially equal to the true value. Accordingly, the noise term in the channel estimation is reduced or eliminated according to the present invention.

SUMMARY OF THE INVENTION

In accordance with one aspect of the present invention, a method for determining a channel impulse response for a channel comprises the following: receiving a signal from the channel, wherein the received signal contains a training sequence and unknown data; and, determining a least squares estimate of the channel impulse response by multiplying the received signal by a stored quantity, wherein the stored quantity is based on (i) a stored replica of the training sequence, and (ii) an assumed covariance matrix that is based on a noise variance and an initial channel impulse response that assumes a unit physical channel.

In accordance with another aspect of the present invention, a method for determining a channel impulse response for a channel comprises the following: receiving a signal from the channel, wherein the received signal contains a training sequence and unknown data; and, determining a least squares estimate of the channel impulse response in accordance with only two factors, wherein the two factors consist of the received signal and a constant.

In accordance with still another aspect of the present invention, a method for determining a channel impulse response for a channel comprises the following: receiving a signal from the channel, wherein the received signal contains a training sequence and unknown data; determining a least squares estimate of the channel impulse response in accordance with only two factors, wherein the two factors consist of the received signal and a constant; and, determining tap weights of an equalizer directly from the least squares estimate of the channel impulse response.

BRIEF DESCRIPTION OF THE DRAWINGS

These and other features and advantages will become more apparent from a detailed consideration of the invention when taken in conjunction with the drawings in which:

FIG. 1 is a table giving values of a CIR for a simulated channel;

FIGS. 2a-2d show the results of a simulation of the present invention based on the test channel provided in the table of FIG. 1; and, FIG. 3 illustrates a portion of a receiver that includes a channel estimator according to an embodiment of the present invention.

DETAILED DESCRIPTION

Figure 2D:
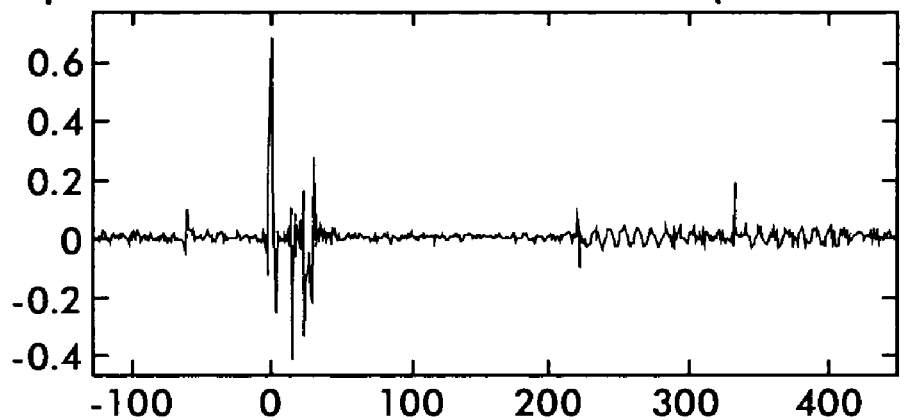

Ideally, a channel estimator that provides a channel estimation in order to adjust the taps of an equalizer should work with channels having long delay spreads $L_d$. In particular, the case where $(NT+1)/2 < L_d < NT$ may be considered. The quantity NT is the duration of the available training sequence, where N is the number of training symbols in the training sequence and T is the symbol period. For instance, the 8-VSB digital TV system has 728 training symbols (N=728), whereas the delays spreads of the terrestrial channels have been observed to be at least 400-500 symbols long.

The output of the pulse-matched filter of a receiver sampled at the baseband symbol rate is given by the following equation:

$$y[n] = y(t)|_{t=nT} = \sum_k I_k h[n-k] + v[n] \quad (1)$$

$$= \sum_k I_k h[n-k] + \sum_k \eta[k] q*[-n+k] \quad (2)$$

where $$I_k = \begin{cases} a_k, & 0 \le k \le N-1 \\ d_k, & N \le n \le N'-1 \end{cases} \in A \equiv \{\alpha_1, \ldots \alpha_M\} \quad (3)$$

where $I_k$ is the M-ary complex valued transmitted sequence, where $A \subset C^1$, where $\{\alpha_k\} \epsilon C^1$ to denote that the first N symbols within a frame of length N' are the known training symbols $a_k$, and where $d_k$ denotes data symbols of unknown values. The complex (colored) noise process after the (pulse) matched filter is given by the following equation:

$$v[n] = \eta[n] * q*[-n] \quad (4)$$

where $\eta[n]$ denotes a zero-mean white Gaussian noise process with variance $\sigma_\eta^2$ per real and imaginary part.

The complex valued impulse response of the composite channel is given by the following equation:

$$h(t) = q(t) * c(t) * q * (-t) = \sum_{k=-K}^{L} c_k p(t - \tau_k) \qquad (5)$$

where q(t) represents the pulse shaping filter of the transmitter, where c(t) represents the physical channel impulse response, where q*(t) represents the matching pulse shaping filter of the receiver, and where q(t) has a finite support of $[-T_q/2, T_q/2]$ The span of the transmit and receive filters, $T_q$, is an even multiple of the symbol period T. That is, $T_q = N_q T$, and $N_q = 2L_q \epsilon Z^+$. $N_q+1$ is the number of taps of the matched filter q, where $q=[q[+L_q], \ldots, q[0], \ldots, q[-L_q]]^T$, and $L_q$ is given immediately above. The complex valued physical channel gains are denoted as $\{c_k\} \subset C^1$, and the multipath delays (or Time-Of-Arrivals (TOA)) are denoted as $\tau_k$.

It is assumed that the time-variations of the channel are slow enough that c(t) can be assumed to be a static intersymbol interference (ISI) channel, at least throughout the training period. Without loss of generality, the composite channel impulse response CIR sampled at the symbol rate is h[n] and can be written as a finite dimensional vector h according to the following equation:

$$h=[h[-N_a], \ldots h[-1], h[0], h[1] \ldots h[N_c]]^T \qquad (6)$$

wherein the superscript T denotes transpose, where $N_a$ and $N_c$ denote the number of anti-causal and causal taps of the channel, respectively, and the delay spread $L_d$ of the channel (including the pulse tails) is given by the following equation:

$$L_d = (N_a + N_c + 1)T \qquad (7)$$

where T denotes the symbol period. The pulse matched filter output which includes all the contributions from the known training symbols and from the adjacent random and unknown data can be written according to the following equation:

$$y_{[-N_a:N+N_c-1]} = (A + D)h + v_{[-N_a:N+N_c-1]} \qquad (8)$$
$$= Ah + Dh + Q\eta_{[-N_a-L_q:N+N_c-1+L_q]}$$
$$= Ah + Hd + Q\eta_{[-N_a-L_q:N+N_c-1+L_q]} \qquad (9)$$

where the matrix A is given by the following equation:

$$A = \mathcal{T}\left\{ \left[a_0, \ldots, a_{N-1}, \underbrace{0, \ldots 0}_{N_a+N_c}\right]^T, \left[a_0, \underbrace{0, \ldots, 0}_{N_a+N_c}\right] \right\} \qquad (10)$$

where the matrix D is given by the following equation:

$$D = \mathcal{T}\left\{ \left[\underbrace{0, \ldots, 0}_{N}, d_N, \ldots, d_{N_c+N_a+N-1}\right]^T, [0, d_{-1}, \ldots, d_{-N_c-N_a}] \right\} \qquad (11)$$

and where $\mathcal{T}$ denotes a Toeplitz matrix. Thus, the matrix A is a Toeplitz matrix of dimension $(N+N_a+N_c)$ by $(N_a+N_c+1)$ having a first column $\{\alpha_0, \alpha_1, \ldots, \alpha_{N-1}, \ldots, 0\}^T$ and a first row $\{\alpha_0, 0, \ldots, 0\}$. The matrix D is also a Toeplitz matrix that includes the adjacent unknown symbols d prior to and after the training sequence. The data sequence $[d_{-1}, \ldots, d_{-N_c-N_a}]$ is the unknown information symbols transmitted at the end of the frame prior to the current frame being transmitted. The matrix Q is of dimension $(N+N_a+N_c)$ by $(N+N_a+N_c+N_q)$ and is given by the following equation:

$$Q = \begin{bmatrix} q^T & 0 & \ldots & 0 \\ 0 & q^T & \ldots & 0 \\ \vdots & \vdots & \ddots & \vdots \\ 0 & 0 & \ldots & q^T \end{bmatrix} \qquad (12)$$

where $q=[q[+L_q], \ldots, q[0], \ldots, q[-L_q]]^T$. The matrix H is given by the following equation:

$$H = \mathcal{H} \, S^T \qquad (13)$$

The matrix $\mathcal{H}$ is given by the following equation:

$$\mathcal{H} = \begin{bmatrix} \bar{h}^T & 0 & \ldots & 0 \\ 0 & \bar{h}^T & \ldots & 0 \\ \vdots & \vdots & \ddots & \vdots \\ 0 & 0 & \ldots & \bar{h}^T \end{bmatrix}_{(N+N_c+N_a) \times (N+2(N_a+N_c))} \qquad (14)$$

The vector $\bar{h}$ is given by the following equation:

$$\bar{h} = [h[N_c], \ldots, h[1], h[0], h[-1], \ldots, h[-N_a]]^T = Jh \qquad (15)$$

The matrix J is a matrix given by the following equation:

$$J = \begin{bmatrix} 0 & \ldots & 0 & 1 \\ 0 & \ldots & 1 & 0 \\ \vdots & \vdots & & \vdots \\ 1 & 0 & \ldots & 0 \end{bmatrix}_{(N_a+N_c+1) \times (N_a+N_c+1)} \qquad (16)$$

The matrix S is a matrix given by the following equation:

$$S = \begin{bmatrix} I_{(N_a+N_c)} & 0_{(N_a+N_c) \times N} & 0_{(N_a+N_c) \times (N_c+N_a)} \\ 0_{(N_a+N_c) \times (N_c+N_a)} & 0_{(N_a+N_c) \times N} & I_{(N_a+N_c)} \end{bmatrix} \qquad (17)$$

where the vector $\bar{h}$ is the time reversed version of the vector h (re-ordering is accomplished by the permutation matrix J), and the matrix H is of dimension $(N+N_a+N_c) \therefore (2(N_a+N_c))$ with a "hole" inside which is created by the selection matrix S.

A correlation based procedure and a least square based procedure are known for estimating the channel. The correlation based estimate of the channel impulse response is given by the following equation:

$$\hat{h}_u = \frac{1}{r_a[0]} A^H y_{[-N_a:N+N_c-1]} \qquad (18)$$

where $\hat{h}_u$ is the uncleaned (includes noise) estimate of the channel, where the superscript H denotes the Hermitian (complex conjugate transpose) operation, and where $r_a[0]$ is given by the following equation:

$$r_a[0] = \sum_{k=0}^{N-1} \|a_k\|^2 \quad (19)$$

The least square based estimate of the channel impulse response is given by the following equation:

$$\hat{h}_c = (A^H A)^{-1} A^H y_{[-N_a:N+N_c-1]} \quad (20)$$

where $\hat{h}_c$ is the cleaned estimate of the channel, and where cleaning is accomplished by removing the unknown sidelobes of a periodic correlation operation which is performed in accordance with equation (18).

Consider the linear model given by the following equation:

$$y = Ax + v \quad (21)$$

where y is the observation (or response) vector, A is the regression (or design) matrix, x is the vector of unknown parameters to be estimated, and v is the observation noise (or measurement error) vector. Assuming that it is known that the random noise vector v is zero mean, and is correlated, that is $$Cov\{v\} = K_v \equiv \frac{1}{2} E\{vv^H\} \neq \sigma_v^2 I,$$

the (generalized) objective function for the model of equation (21) is given by the following equation:

$$J_{GLS}(x) = (Y - Ax)^H K_v^{-1}(y - Ax) \quad (22)$$

The least squares estimate that minimizes equation (22) is given by the following equation:

$$\hat{x}_{gls} = (A^H K_v^{-1} A)^{-1} A^H K_v^{-1} y \quad (23)$$

The estimator of equation (23) is called the best linear unbiased estimate (BLUE) among all linear unbiased estimators if the noise covariance matrix is known to be $Cov\{v\} = K_v$. If the noise v is known to be Gaussian with zero mean and with covariance matrix $K_v$, that is if it is known that $v \sim \mathcal{N}(0, K_v)$, then the estimator of equation (23) is called the minimum variance unbiased estimator (MVUE) among all unbiased estimators (not only linear).

The two terms on the right most side of Equation (9) can be denoted by v according to the following equation:

$$v = Hd + Q\eta_{[-N_a-L_q:N+N_c-1+L_q]} \quad (24)$$

Accordingly, equation (9) can be re-written according to the following equation:

$$y_{[-N_a:N+N_c-1]} Ah + v \quad (25)$$

By noting that the random vectors d and η are statistically independent, and also by noting that both d and η are zero mean vectors, the covariance matrix, $K_v$, of v may be given by the following equation:

$$Cov\{v\} = K_v \equiv \frac{1}{2} E\{vv^H\} = \frac{\varepsilon_d}{2} HH^H + \sigma_\eta^2 QQ^H \quad (26)$$

where $\varepsilon_d$ is the energy of the transmitted information symbols, and equals to 21 if the transmitted information symbols $\{d_k\}$ are chosen from the set $\{\pm 1, \pm 3, \pm 5, \pm 7,\}$. The covariance matrix $K_v$ describes the statistics of the unknown data and noise. In other words, the covariance matrix $K_v$ is a measure of the correlation of the signal at the output of the matched filter q. For the model of equation (25), the generalized least squares objective function to be minimized is given by the following equation:

$$J_{GLS}(y) = (y_{[N_a+N_c-1]}^a - Ah)^H K_v^{-1}(y_{[-N_a:N+N_c-1]} - Ah) \quad (27)$$

Then, the generalized least-squares solution to the model of Equation (25) which minimizes the objective function of $J_{GLS}(y)$ is given by the following equation:

$$\hat{h}_K = (A^H K_v^{-1}) y_{[-N_a:N+N_c-1]} \quad (28)$$

Equation (28) yields a best linear unbiased channel estimate in which noise arising from the correlation of the stored training sequence with unknown data is reduced or substantially eliminated as compared with the channel estimates given by equations (18) and (20). The problem with Equation (28) is that the channel estimate $\hat{h}_K$ is based on the covariance matrix $K_v$, which is a function of both the true channel impulse response vector h and the channel noise variance $\sigma_\eta^2$. In actual applications, the best linear unbiased channel estimate of equation (28) can not be exactly obtained.

Hence, an iterative technique may be used to calculate a generalized least squares estimate of equation (28) where every iteration produces an updated estimate of the covariance matrix $K_v$ as well as the channel noise variance $\sigma_\eta^2$. A simplified version of the iterations, which yield a closer approximation to the exact best linear unbiased estimate of the channel impulse response after each step, is provided in the following Algorithm. This algorithm is an iterative algorithm to obtain a generalized least-squares channel impulse response (CIR) estimate.

ALGORITHM

[1] Get an initial CIR estimate using one of equation (18) or equation (20), and denote this initial CIR by $\hat{h}[]$;

[2] Threshold the initial CIR estimate, and denote the thresholded CIR by $\hat{h}^{(th)}[0]$;

[3] Estimate the noise variance $\hat{\sigma}^2[0]$;

[4] for k=1, ... $N_{iter}$, do

[4-a] Calculate the inverse of the (estimated) covariance matrix $\hat{K}_v^{-1}[k]$ according to the following equation:

$$\hat{K}_v^{-1}[k] = \left[\frac{\varepsilon_d}{2} H(\hat{h}^{(th)}[k-1]) H^H(\hat{h}^{(th)}[k-1]) + \hat{\sigma}_\eta^2[k-1] QQ^H\right]^{-1}; \quad (29)$$

where $\hat{h}^{(th)}$ is the result of step [2] and H is derived by forming the time reverse of $\hat{h}^{(th)}$ according to equation (15), inserting the time reverse of $\hat{h}^{(th)}$ into equation (14) to obtain $\mathcal{H}$, and then inserting $\mathcal{H}$ into equation (13) to obtain H;

[4-b] calculate the updated channel estimate according to the following equation:

$$\hat{h}_k[k] = (A^H \hat{K}_v^{-1}[k] A)^{-1} A^H \hat{K}_v^{-1}[k] y_{[-N_a:N+N_c-1]}; \quad (30)$$

[4-c] Threshold the CIR estimate $\hat{h}_K[k]$ and denote the thresholded CIR estimated by $\hat{h}^{(th)}[k]$;

[4-d] Estimate the noise variance $\hat{\sigma}_\eta^2[k]$.

end for

Any known thresholding can be implemented for steps [2] and [4-c]. This algorithm could be stopped after step [4-b] or step [4-c]. However, iterations of steps [4-a] to [4-d] give a more refined channel estimate.

In the intermediate steps of [3] and [4-d], the noise variance is estimated in accordance with the following equation:

$$\hat{\sigma}_\eta^2 = \frac{1}{2\varepsilon_q(N-N_a-N_c)} \|\hat{y}_{[N_c:N-N_a]} - y_{[N_c:N-N_a]}\|^2 \quad (31)$$

where $$\varepsilon_q = \|q\|^2 \quad (32)$$

$$\hat{y}_{[N_c:N-N_a]} = \tilde{A}\hat{h}^{th} \quad (33)$$

$$\tilde{A} = /\mathcal{T} \ \{[a_{N_c+N_a}, \ldots, a_{N-1}]^T, [a_{N_c+N_a}, \ldots, a_0]\}. \quad (34)$$

The present invention was simulated using an 8-VSB receiver with a single antenna. The 8-VSB system has a complex raised cosine pulse shape. The channel parameters for the simulation are given in the table of FIG. 1. The phase angles of individual paths for all the channels are taken to be given by the following equation:

$$\arg\{c_k\} = \exp(-j2\pi f_c \tau_k) \text{ for } k = -2, \ldots, 6 \quad (35)$$

where $$f_c = \frac{50}{T_{sym}} \quad (36)$$

$$T_{sym} = 92.9 \text{ nsec} \quad (37)$$

The simulation was run at a 28 dB Signal-to-Noise-Ratio (SNR) measured at the input to the receive pulse matched filter, and SNR was calculated according to the following equation:

$$SNR = \frac{\varepsilon_d \|\{c(t) * q(t)\}_{t=kT}\|^2}{\sigma_\eta^2} \quad (38)$$

FIG. 2a-2d show the simulation results for the test channel provided in the table of FIG. 1. Specifically, FIG. 2a shows the actual CIR, FIG. 2b shows the correlation based CIR estimate according to equation (18), FIG. 2c shows the least squares based CIR estimate of equation (20), and FIG. 2d shows the best linear unbiased channel estimate according to the algorithm disclosed above after only the first iteration. The results of the algorithm even after only one iteration are superior as compared to the correlation based and ordinary least squares based CIR estimation schemes. The performance measure is the normalized least-squares error which is defined by the following equation:

$$\varepsilon_{NLS} = \frac{\|h-\hat{h}\|^2}{N_a + N_c + 1} \quad (39)$$

Figure 3:
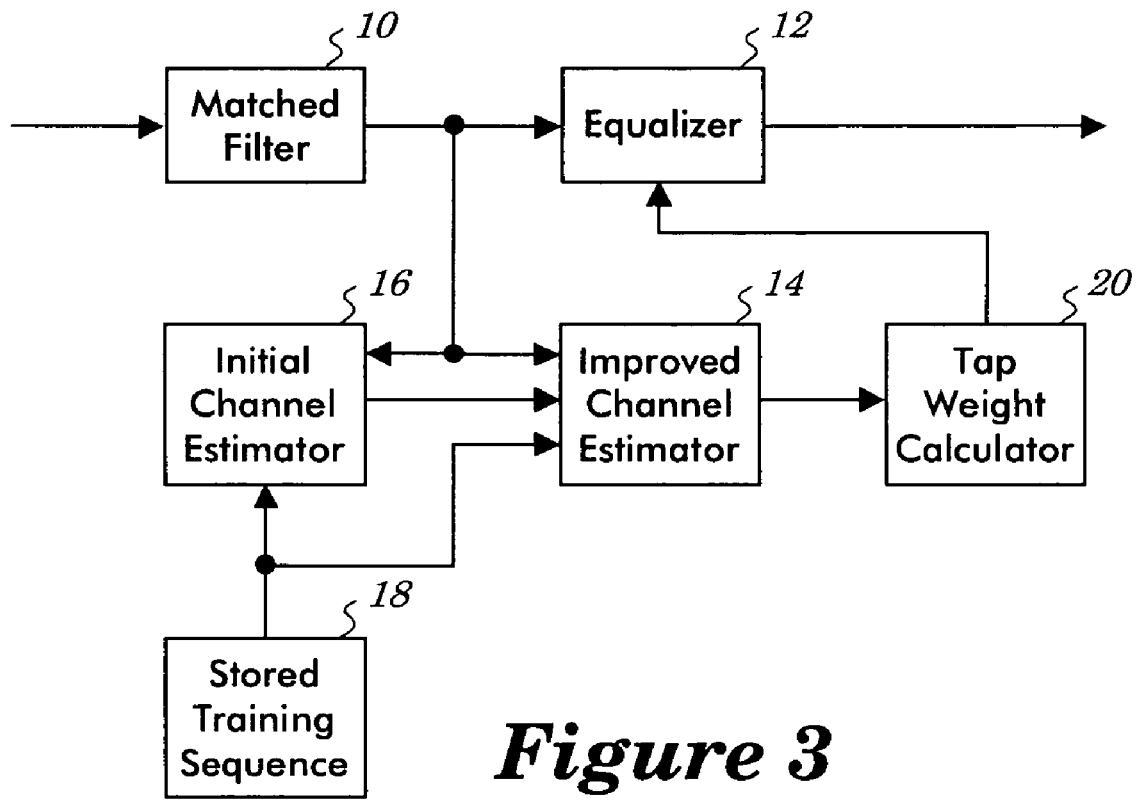

As shown in FIG. 3, a portion of a receiver pertinent to the present invention includes a matched filter 10 that is referred to above as q*(−t). The received signal passes through the matched filter 10 to an equalizer 12 such as a linear FIR filter, a decision feedback equalizer (DFE), or a maximum likelihood sequence estimate (MLSE) equalizer having taps whose initial tap weights may be determined in accordance with the channel impulse response determined by the algorithm as described above.

Accordingly, the output of the matched filter 10 is provided to an improved channel impulse response estimator 14 and to an initial channel impulse response estimator 16. The initial channel impulse response estimator 16 determines the initial channel impulse response $\hat{h}[0]$ according to either equation (18) or equation (20) as described above in step 1 of the algorithm. The initial channel impulse response estimator 16 provides the initial channel impulse response $\hat{h}[0]$ to the improved channel impulse response estimator 14.

In determining the initial channel impulse response $\hat{h}[0]$ in accordance with either equation (18) or equation (20), the initial channel impulse response estimator 16 uses a replica of the transmitted training symbols $a_k$ and the received signal vector y. The replica of the transmitted training symbols $a_k$ is stored in a memory 18. The received signal vector y is output from the matched filter 10 and includes both the transmitted training symbols $a_k$ and the unknown data symbols $d_k$. The replica of the transmitted training symbols $a_k$ stored in the memory 18 is designated as the matrix A in equations (18) and (20).

The channel impulse response estimator 14 implements the algorithm disclosed above in order to improve the initial estimate of the channel impulse response for the channel between the transmitter and the receiver. Accordingly, the improved channel impulse response estimator 14 thresholds the initial CIR estimate $\hat{h}[0]$, estimates the noise variance $\hat{\sigma}^2[0]$ as disclosed above, and performs the iterations for $k = 1, \ldots, N_{iter}$, where $N_{iter}$ may be any number. As a result, the channel impulse response estimator 14 determines a final thresholded CIR $\hat{h}^{(th)}[k]$ which it supplies to a tap weight calculator 20 that calculates the initial tap weights for the taps of the equalizer 12 based on a channel impulse response. The tap weight calculator 20 may implement a suitable known tap weight calculation algorithm.

An alternative approach may be used to produce results of nearly the same quality as the results produced by the algorithm described above while at the same time requiring much less computational complexity (i.e., requiring about the same number of multiplications necessary to implement equation (20)) and having storage requirements similar to that of equation (20). According to this alternative, the initial least squares estimation error can be reduced by seeking an approximation in which it is assumed that the baseband representation of the physical channel c(t) is a unit Dirac-delta function according to the following equation:

$$c(t) = \delta(t). \quad (40)$$

(Accordingly, the unit physical channel represented by the Dirac-delta function is assumed to be a perfect channel having no distortion or attenuation.) This relationship implies the following:

$$h(t) = p(t)*c(t) = p(t). \quad (41)$$

Thus, it can be assumed that the finite length channel impulse response vector can be (initially) approximated according to the following equation:

$$\tilde{h} = [\underbrace{0, \ldots, 0}_{N_a-N_q}, p[-N_q], p[-N_q+1], \ldots, \quad (42)$$

$$p[-1], p[0], p[1], \ldots, p[N_q-1], \underbrace{0, \ldots 0}_{N_c-N_q}]^T$$

with the assumptions that $N_a \geq N_q$ and $N_c \geq N_q$. That is, the tail span of the composite pulse shape is well confined to within the assumed delay spread of $[-N_a T, N_c T]$. Then, the approximation of equation (42) can be substituted into equations (13-17) to yield an initial (approximate) channel convolution matrix $\tilde{H}$ that is given by the following equation:

$$\tilde{H} = \mathcal{H} \ S^T \quad (43)$$

where $\mathcal{H}$ is formed as in Equation (14) with $\bar{h} = J\tilde{h}$. It can also be assumed that a reasonable received Signal-to-Noise (SNR) ratio measured at the input to the matched filter is 20 db. This SNR is given by the following equation:

$$SNR = \frac{\varepsilon_d \|\{c(t)*q(t)\}_{t=nT}\|^2}{\sigma_\eta^2} \quad (44)$$

which can be re-written as the following:

$$SNR = \frac{\varepsilon_d \|q\|^2}{\sigma_\eta^2} \quad (45)$$

For an approximate SNR of 20 dB, an initial noise variance is given by the following equation:

$$\tilde{\sigma}_\eta^2 = \frac{\varepsilon_d \|q\|^2}{100}. \quad (46)$$

A fixed SNR can be assumed as long as the SNR is reasonably close to the actual SNR with which the receiver is expected to operate. For example, a digital television receiver meeting the ATSC standard is expected to operate at greater than a 15 db SNR and, therefore, it is reasonable to assume a SNR of 20 db.

By combining $\tilde{H}$ and $\tilde{\sigma}_\eta^2$, the initial approximate covariance matrix can be pre-calculated according to the following equation:

$$\tilde{K}_v(\tilde{H}) = \frac{1}{2}\varepsilon_d \tilde{H}\tilde{H}^H + \tilde{\sigma}_\eta^2 QQ^H \quad (47)$$

which further leads to the initial channel estimate according to the following equation:

$$\hat{h}_{\tilde{K}} = (A^H [\tilde{K}_v(\tilde{H})]^{-1} A)^{-1} A^H [\tilde{K}_v(\tilde{H})]^{-1} y_{[-N_a:N+N_c-1]} \quad (48)$$

Equation (48) produces an initial channel estimate for step 1 of the algorithm disclosed above. Subsequently, the algorithm can proceed as described above to generate an improved channel estimate with each iteration of the do loop.

On the other hand, the channel impulse response estimate produced by equation (48) is good enough that it could be used by itself to produce the initial tap weights of an equalizer. In this case, the quantity $(A^H [\tilde{K}_v(\tilde{H})]^{-1} A)^{-1} A^H [\tilde{K}_v(\tilde{H})]^{-1}$ from equation (48) can be pre-calculated because A is based on the known stored training sequence, $\tilde{K}_v(\tilde{H})$ is known from equation (47), $\tilde{H}$ in equation (47) is known from equations (13-17) which has all known terms including the vector h given by equation (42). This quantity may be stored and then applied in the receiver to the received signal vector y when it is desired to determine the initial tap weights for the equalizer. Thus, the channel impulse response estimator 14 can be eliminated, and the channel impulse response estimator 16 implements equation (48) based on the stored quantity from equation (48) and the received signal vector y.

As an example of representative numbers for a digital television receiver, the number of training symbols N=704, $N_q$=60, $L_q$=30, q=61 taps, p=121 taps, the number of anti-causal taps $N_a$=127, the number of causal taps $N_c$=448, and the delay spread $L_d$=576T.

Modifications of the present invention will occur to those practicing in the art of the present invention. Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

I claim:

1. A method for determining a channel impulse response for a channel comprising:

receiving a signal from the channel, wherein the received signal contains a training sequence and unknown data; and, determining a least squares estimate of the channel impulse response by multiplying the received signal by a stored quantity, wherein the stored quantity is based on (i) a stored replica of the training sequence, and (ii) an assumed covariance matrix that is based on a noise variance and an initial channel impulse response that assumes a unit physical channel.

2. The method of claim 1 wherein the stored quantity is given by the following expression:

$$(A_H [\tilde{K}_v(\tilde{H})]^{-1} A)^{-1} A^H [\tilde{K}_v(\tilde{H})]^{-1}$$

wherein A is based on the stored replica of the training sequence, wherein $\tilde{K}_v$ is the covariance matrix, and wherein $\tilde{H}$ is based on the initial channel impulse response that assumes a unit physical channel.

3. The method of claim 2 wherein the covariance matrix $\tilde{K}_v$ is given by the following equation:

$$\tilde{K}_v(\tilde{H}) = \frac{1}{2}\varepsilon_d \tilde{H}\tilde{H}^H + \tilde{\sigma}_\eta^2 QQ^H$$

wherein $\tilde{\sigma}_\eta^2$ is the noise variance and is given by the following equation:

$$\tilde{\sigma}_\eta^2 = \frac{\varepsilon_d \|q\|^2}{C}$$

and wherein $\varepsilon_d$, Q, and q are based on a matched filter, wherein C is a constant given by the following equation:

$$C = 10^{\frac{SNR[db]}{10}}.$$

4. The method of claim 3 wherein is given by the following equation:

$$\tilde{H} = \mathcal{H}\ S^T$$

wherein $\mathcal{H}$ is given by the following equation:

$$\tilde{h} = J\tilde{h}$$

wherein $\tilde{h}$ is based on the initial channel impulse response that assumes a unit physical channel, wherein J is a matrix given generally by the following equation:

$$J = \begin{bmatrix} 0 & \cdots & 0 & 1 \\ 0 & \cdots & 1 & 0 \\ \vdots & \vdots & & \vdots \\ 1 & 0 & \cdots & 0 \end{bmatrix}$$

wherein S is a matrix given generally by the following equation:

$$S = \begin{bmatrix} I & 0 & 0 \\ 0 & 0 & I \end{bmatrix}$$

wherein I is the identity matrix.

5. A method for determining a channel impulse response for a channel comprising:
  receiving a signal from the channel, wherein the received signal contains a training sequence and unknown data; and,
  determining a least squares estimate of the channel impulse response in accordance with only two factors, wherein the two factors consist of the received signal and a constant.

6. The method of claim 5 wherein the constant is given by the following expression:

$$(A^H[\tilde{K}_v(\tilde{H})]^{-1}A)^{-1}A^H[\tilde{K}_v(\tilde{H})]^{-1}$$

wherein A is based on the stored replica of the training sequence, wherein $\tilde{K}_v$ is the covariance matrix, and wherein $\tilde{H}$ is based on the initial channel impulse response that assumes a unit physical channel.

7. The method of claim 6 wherein the covariance matrix $\tilde{K}_v$ is given by the following equation:

$$\tilde{K}_v(\tilde{H}) = \frac{1}{2}\varepsilon_d \tilde{H}\tilde{H}^H + \tilde{\sigma}_\eta^2 QQ^H$$

wherein $\tilde{\sigma}_\eta^2$ is the noise variance and is given by the following equation:

$$\tilde{\sigma}_\eta^2 = \frac{\varepsilon_d \|q\|^2}{C}$$

and wherein $\varepsilon_d$, Q, and q are based on a matched filter, wherein C is a constant given by the following equation:

$$C = 10^{\frac{SNR[db]}{10}}.$$

8. The method of claim 7 wherein $\tilde{H}$ is given by the following equation:

$$\tilde{H} = \mathcal{H} \, S^T$$

wherein $\mathcal{H}$ is given by the following equation:

$$\tilde{h} = J\tilde{h}$$

wherein $\tilde{h}$ is based on the initial channel impulse response that assumes a unit physical channel, wherein J is a matrix given generally by the following equation:

$$J = \begin{bmatrix} 0 & \cdots & 0 & 1 \\ 0 & \cdots & 1 & 0 \\ \vdots & \vdots & & \vdots \\ 1 & 0 & \cdots & 0 \end{bmatrix}$$

wherein S is a matrix given generally by the following equation:

$$S = \begin{bmatrix} I & 0 & 0 \\ 0 & 0 & I \end{bmatrix}$$

wherein I is the identity matrix.

9. The method of claim 5 wherein the determining of a least squares estimate of the channel impulse response comprises multiplying the received signal by the constant.

10. The method of claim 5 wherein the constant is based on (i) the training sequence and (ii) an assumed covariance matrix that combines an assumed noise variance and an assumed channel.

11. The method of claim 10 wherein the determining of a least squares estimate of the channel impulse response comprises multiplying the received signal by the constant.

12. A method for determining a channel impulse response for a channel comprising:
  receiving a signal from the channel, wherein the received signal contains a training sequence and unknown data;
  determining a least squares estimate of the channel impulse response in accordance with only two factors, wherein the two factors consist of the received signal and a constant; and,
  determining tap weights of an equalizer directly from the least squares estimate of the channel impulse response.

13. The method of claim 12 wherein the constant is given by the following expression:

$$(A^H[\tilde{K}_v(\tilde{H})]^{-1}A)^{-1}A^H[\tilde{K}_v(\tilde{H})]^{-1}$$

wherein A is based on the stored replica of the training sequence, wherein $\tilde{K}_v$ is the covariance matrix, and wherein $\tilde{H}$ is based on the initial channel impulse response that assumes a unit physical channel.

14. The method of claim 13 wherein the covariance matrix $\tilde{K}_v$ is given by the following equation:

$$\tilde{K}_v(\tilde{H}) = \frac{1}{2}\varepsilon_d \tilde{H}\tilde{H}^H + \tilde{\sigma}_\eta^2 QQ^H$$

wherein $\tilde{\sigma}_\eta^2$ is the noise variance and is given by the following equation:

$$\tilde{\sigma}_\eta^2 = \frac{\varepsilon_d \|q\|^2}{C}$$

and wherein $\varepsilon_d$, Q, and q are based on a matched filter, wherein C is a constant given by the following equation:

$$C = 10^{\frac{SNR[db]}{10}}.$$

15. The method of claim 14 wherein $\tilde{H}$ is given by the following equation:

$$\tilde{H} = \mathcal{H} \ S^T$$

wherein $\mathcal{H}$ is given by the following equation:

$$\tilde{h} = J\tilde{h}$$

wherein $\tilde{h}$ is based on the initial channel impulse response that assumes a unit physical channel, wherein J is a matrix given generally by the following equation:

$$J = \begin{bmatrix} 0 & \cdots & 0 & 1 \\ 0 & \cdots & 1 & 0 \\ \vdots & \vdots & & \vdots \\ 1 & 0 & \cdots & 0 \end{bmatrix}$$

wherein S is a matrix given generally by the following equation:

$$S = \begin{bmatrix} I & 0 & 0 \\ 0 & 0 & I \end{bmatrix}$$

wherein I is the identity matrix.

16. The method of claim 12 wherein the determining of a least squares estimate of the channel impulse response comprises multiplying the received signal by the constant.

17. The method of claim 12 wherein the constant is based on (i) the training sequence and (ii) an assumed covariance matrix that combines an assumed noise variance and an assumed channel.

18. The method of claim 17 wherein the determining of a least squares estimate of the channel impulse response comprises multiplying the received signal by the constant.

* * * * *